(12) United States Patent
Brennan et al.

(10) Patent No.: US 7,427,373 B1
(45) Date of Patent: Sep. 23, 2008

(54) METHOD AND APPARATUS FOR FORMING A CLOSURE DEVICE AND A CONTAINER

(75) Inventors: Sean M. Brennan, Avon, OH (US); Vincent J. Brennan, Orange Park, FL (US); Thomas A. Berman, Lorain, OH (US); John Yurglic, Huron, OH (US)

(73) Assignee: Pacific Management Holding, LLC, Elyria, OH (US)

( * ) Notice: Subject to any disclaimer, the term of this patent is extended or adjusted under 35 U.S.C. 154(b) by 582 days.

(21) Appl. No.: 10/932,155

(22) Filed: Sep. 1, 2004

(51) Int. Cl.
*B29C 45/40* (2006.01)
(52) U.S. Cl. .................................. 264/334; 264/328.1
(58) Field of Classification Search ........................ None
See application file for complete search history.

(56) References Cited

U.S. PATENT DOCUMENTS

| | | | |
|---|---|---|---|
| 4,053,078 A | 10/1977 | Herr | |
| 4,397,397 A | 8/1983 | Herr | |
| 4,806,301 A * | 2/1989 | Conti | .......................... 264/334 |
| 5,281,385 A * | 1/1994 | Julian | .......................... 264/318 |
| 5,449,078 A | 9/1995 | Akers | |
| 5,512,228 A * | 4/1996 | Adams et al. | ................ 264/152 |
| 5,833,912 A * | 11/1998 | Schweigert et al. | ......... 264/318 |
| 5,938,055 A | 8/1999 | Philips et al. | |
| 6,161,711 A | 12/2000 | Miceli et al. | |
| 6,446,823 B2 | 9/2002 | Miceli et al. | |
| 6,523,709 B2 | 2/2003 | Miceli et al. | |
| D492,596 S | 7/2004 | Miceli et al. | |

\* cited by examiner

*Primary Examiner*—Monica A Huson
(74) *Attorney, Agent, or Firm*—MacMillan, Sobanski & Todd, LLC

(57) ABSTRACT

A method for forming a closure device for a container is disclosed including providing a first mold component having a first annular groove. The first annular groove is configured to form a skirt of the closure device. A plurality of ejector blades are provided and are positioned within the mold component. The blades include a notch for forming a lug on an inner surface of the skirt. The lug is back-locked relative to the mold component. A moldable material is introduced into a mold cavity to form the closure device. The device is removed from the mold component by moving the blades along a path defined by tracks formed in the mold component that is generally along a vertical axis of the mold component, wherein the path includes a radially outward component, and the moving of the blades relieves the back-lock of the lug formed on the closure device.

12 Claims, 6 Drawing Sheets

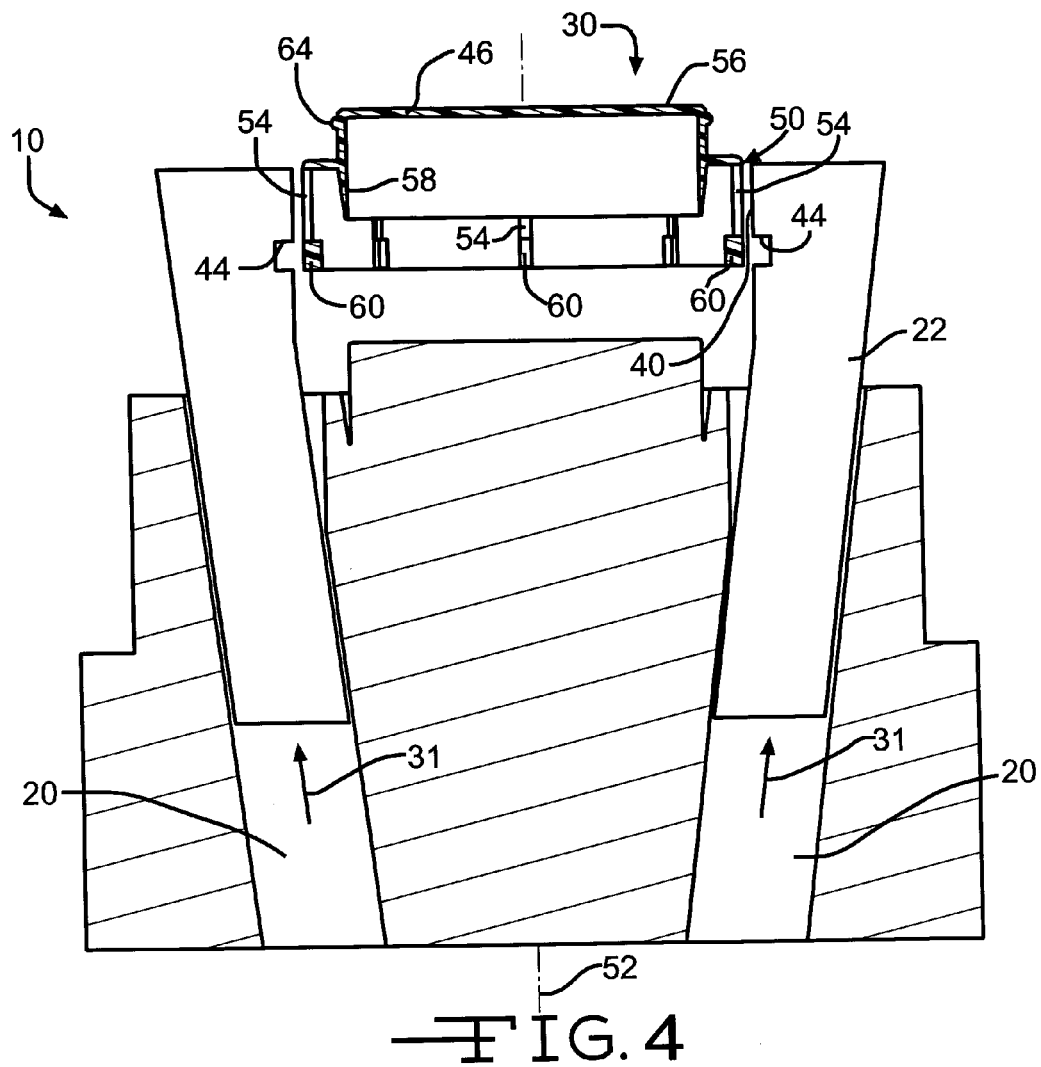
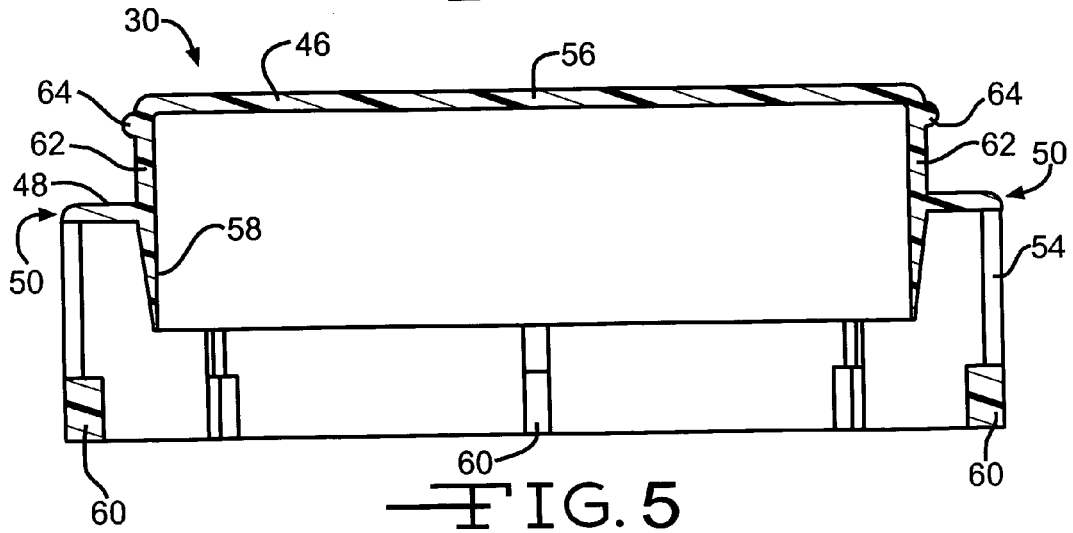

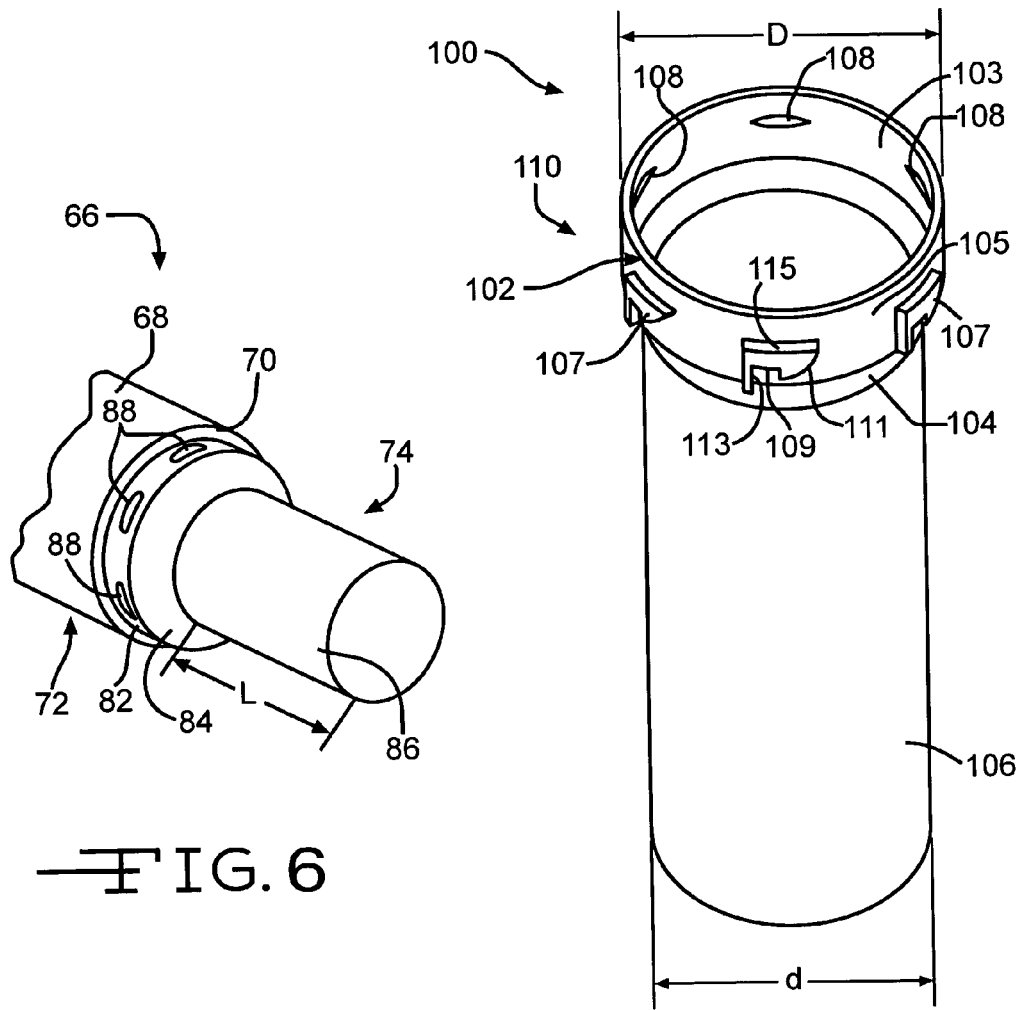
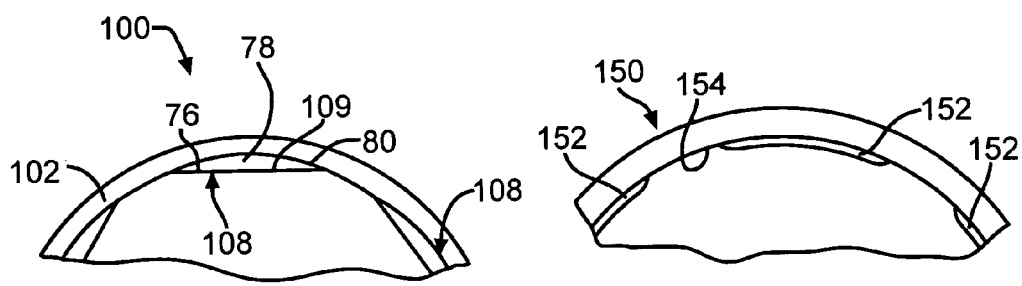

US 7,427,373 B1

METHOD AND APPARATUS FOR FORMING A CLOSURE DEVICE AND A CONTAINER

BACKGROUND OF THE INVENTION

This invention relates in general to medicine containers having lockable closures, and more particularly, to such containers wherein the lockable closures are both child-resistant (CR) and non-child-resistant (NCR), or easily opened by the elderly.

Due to the potential damaging ramifications of children consuming or having access to medications and other dangerous materials not intended for children's use, certain medications and other substances are packaged in CR containers. There are a multitude of containers available to package such medication and materials. Among these containers is a closure mechanism that requires a user to rotate the cap with respect to the container until two marks (e.g. arrows) align, at which point a finger tab may be moved upward and the cap pried from the container to an open position.

Another type of CR container is a push and turn type and includes a cap having an outer shell and an inner sealing threaded cap. The outer shell freely rotates about the inner sealing retainer until a predetermined downward force is applied by the adult user. The downward force engages the outer shell with the inner threaded cap and must be maintained throughout the opening procedure. The retainer includes conventional threads and once engaged with the outer shell, its rotation by the adult user will open the container.

Still another type of CR container includes a push and turn type that includes a cap having an outer shell and an inner seal. The outer shell includes a skirt having lugs formed thereon. The lugs are adapted to cooperate with a bayonet structure formed on an outer surface of the container. The downward and rotational force on the cap causes the lugs to slide around a cam surface on the bayonets. The lugs then engage a recess on the bayonet to lock the cap to the container.

Although these conventional containers discourage children from gaining access to the medicine or chemicals located within the container while providing fair access to adults, the operations required to open these containers have proven to be very difficult to perform by elderly, disabled, or injured users, or by those otherwise lacking in hand coordination.

A problem with the conventional "push and turn" containers is that during opening, the user must force the cap towards the container body to ensure that the outer skirt remains engaged with the inner retainer, while the cap is rotated away from the container body. This opposing mechanical action required to open the conventional push and turn CR containers can be very uncomfortable to the user and adds to the difficulty and frustration in opening the container.

Owing to the difficulties in opening conventional CR containers, many users may deliberately leave the container open so that they may readily access their medicine in the future. An obvious problem resulting in leaving a medicine container open or effectively open (i.e., disabling any CR lock) is that children also may gain access to the medicine. Such action could also cause degradation of the medication due to moisture or other substances coming into contact with the medication. People may also transfer their medications to other containers for storage. The problem therein is that the medications would be kept separate from their instructions, safety information, and dosage information. Additionally, the medications could be intermixed with other medications. One reason to have NCR containers is for people who have no children that could accidentally access the dangerous substances and might not want to have a CR container when a NCR container would suffice.

Therefore, there recently has been an interest in providing new types of containers for those adults who have difficulty in manipulating conventional CR containers or even regular, NCR containers. For the most part, these "senior-friendly" containers have provisions which allow the elderly (or those otherwise lacking in hand coordination and dexterity) to easily open the container, but unfortunately do not also include CR features to prevent access to the drugs by children. Although there are closure devices having both CR and NCR features, there is a need for improved closure devices and containers, and a method for making them.

SUMMARY OF THE INVENTION

This invention relates to a method for forming a closure device for a container. The method includes providing a first mold component having a first annular groove, wherein the first annular groove is configured to form a skirt of the closure device; providing a plurality of ejector blades positioned within the first mold component, each of the blades including a notch thereon for forming a lug on an inner surface of the skirt of the closure device, each lug being back-locked relative to the first mold component; providing a second mold component configured to cooperate with the first mold component to define a mold cavity; introducing a moldable material into the mold cavity to form the closure device; and removing the closure device from the first mold component by moving the blades along a path defined by a plurality of tracks formed in the first mold component that is generally along a vertical axis of the first mold component, wherein the path includes a radially outward component, and the moving of the blades relieves the back-lock of the lugs formed on the closure device.

The invention also relates to a method of molding a closure device for a container including providing a first mold component having an annular groove, wherein the groove is configured to form a skirt of the closure device; providing a second mold component configured to cooperate with the first mold component to form a complete mold assembly, the mold assembly defining a mold cavity, wherein cooperating faces of the first mold component and the second mold component define a parting line; and introducing a moldable material into the mold cavity to form an upper portion of the closure device and the skirt of the closure device, wherein the skirt is formed below the parting line of the mold assembly.

The invention also relates to a generally cylindrical container having an open end portion and a closed end portion that includes an intermittent ridge having a tapered profile formed on an inner surface of the open end portion of the container, the ridge being configured to cooperate with a snap ring formed on a first closure device to releasably secure the first closure device to the container.

The invention also relates to a method of forming a generally cylindrical container including the steps of providing a generally cylindrical male mold component having a plurality of intermittent grooves having a tapered profile formed thereon, providing a female mold component defining a generally cylindrical recess, positioning the male mold component substantially coaxially within the recess of the female mold component with the space between the male mold component and the female mold component defining a mold cavity, introducing a moldable material into the mold cavity, molding the moldable material into the container, separating the male mold component from the female mold component, and removing the molded container from the mold cavity.

The invention also relates to a system for providing containers and closure devices for the containers that includes providing a plurality of containers, each of the containers having a lip portion having a substantially similarly sized diameter, the lip portion being configured to cooperate with a closure device, the lip portion having an intermittent ridge on an inner surface of the lip portion, and having a bayonet closure mechanism on an outer surface of the lip portion; providing a first closure device, the first closure device being configured to cooperate with both the snap ring and the bayonet closure mechanism to releasably retain the closure device with the container so that the closure device can be attached to the container in either a child-resistant or a non-child-resistant mode; providing a second closure device, the second closure device being configured to cooperate with the intermittent ridge to releasably retain the closure device with the container; providing a third closure device, the third closure device being configured to cooperate with the bayonet closure mechanism to releasably retain the closure device with the container; selecting one of the first closure device, the second closure device and the third closure device, each closure device being configured to releasably seal the container; and assembling the selected closure device and container.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a sectional view of the first mold component shown in FIG. 2 with the blades according to the invention in an extended position.

FIG. 5 is an enlarged sectional view of a first closure device formed by the first and second mold components according to the present invention.

FIG. 6 is a perspective view of a first male mold component for forming a container according to the present invention.

FIG. 7 is a perspective view of the container formed using the mold of FIG. 6 according to the present invention.

FIG. 8 is a partial plan view of the container of FIG. 7 showing the ridge profile according to the present invention.

FIG. 11 is a partial plan view of a prior art container showing a ridge profile of the container.

DETAILED DESCRIPTION OF THE PREFERRED EMBODIMENT

Preliminarily, it should be noted that certain terms used herein, such as "upper", "lower", "top", "bottom", "front", "back", "backward", "forward", "left", "right", "height", "width", "length", and "side", are used to facilitate the description of the preferred embodiments of the invention. Unless otherwise specified or made apparent by the context of the discussion, such terms should be interpreted with reference to the figure under discussion. Such terms are not intended as a limitation on the position in which the components of the invention may be used or oriented during use. Indeed, it is contemplated that the components of the invention may be easily positioned in any desired orientation for use. In addition, the terms "inboard", "outboard", "upward", and "downward" are also used in conjunction with the description of the preferred embodiments of the invention. For the purpose of facilitating this description the term "inboard" is intended to mean that a component is at a position closer to the axis 52 of the apparatus. The term "outboard" is intended to mean that a component is at a position farther away from the axis 52 of the apparatus.

Figure 1:
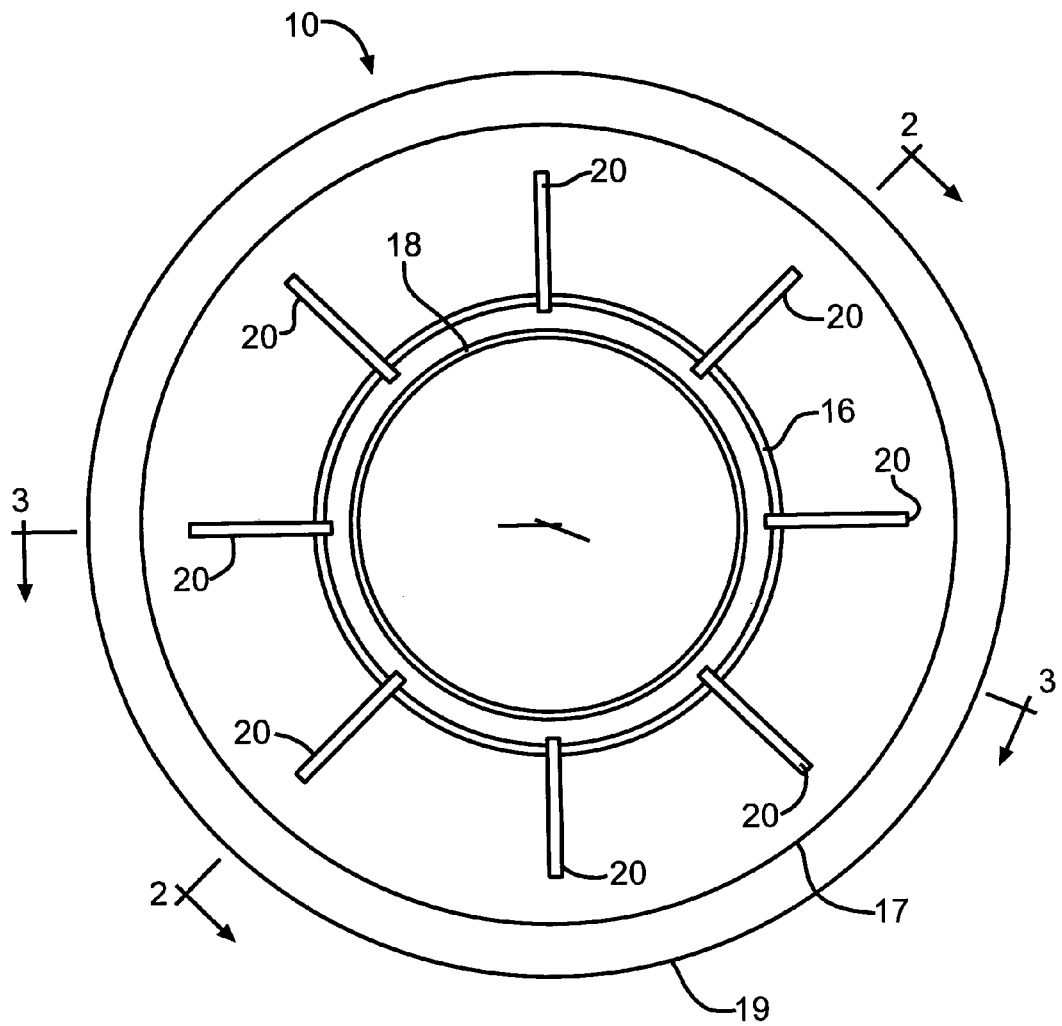
FIG. 1 is a plan view of a first mold component according to the present invention.

Referring now to the drawings, there is illustrated in FIG. 1 a plan view of a first mold component, indicated generally at 10. The first mold component 10 is configured to cooperate with a second mold component 12 (shown in FIG. 2) to define a mold cavity 14. The process of molding a part is generally known in the art and includes introducing a moldable material into the mold cavity 14. The moldable material is generally in the form of a molten or semi-solid material, such as metal or plastic, when it is introduced into the mold cavity 14. Enough material is introduced into the mold cavity 14 so that the mold cavity 14 is substantially filled with the material. The material is then allowed to cool. During cooling, the moldable material substantially takes the shape of the mold cavity 14. The first mold component 10 and second mold component 12 are then separated and the molded component is removed from the first mold component 10. As shown, the molded component is shown to be retained with the first mold component 10 after the molding operation is completed. It should be appreciated that the molding apparatus can have any suitable configuration so that the molded component is retained with either the first mold component 10 or second mold component 12.

The first mold component 10 illustrated in FIG. 1 is substantially cylindrical having an upper outer cylindrical surface 17 and a lower outer cylindrical surface 19 that is in a stepped relation to the upper outer cylindrical surface 17. It should be appreciated that the first mold component 10 can have any suitable configuration that facilitates the design and operation of the molding apparatus. The first mold component also includes a first annular groove 16 and a second annular groove 18. The first annular groove 16 and second annular groove 18 are substantially concentric and are also preferably concentric with the upper outer cylindrical surface 17 of the first mold component 10. The first annular groove 16 and the second annular groove 18 each have a depth (more clearly shown in FIG. 2). The first annular groove 16 and second annular groove 18 therefore also define a portion of the mold cavity 14. That is, the first and second grooves 16 and 18 are configured to receive the moldable material therein. Intersecting the first annular groove 16 are a plurality of tracks 20. The tracks 20 are equally spaced about the circumference of the first annular groove 16 and intersect the groove 16 in a substantially perpendicular manner. As will be described in greater detail below, each of the plurality of tracks 20 is configured to receive an ejector blade 22 that is used to block a portion of the first annular groove 16 from receiving the moldable material. In addition, the ejector blades 22 are used to remove the molded component from the mold component 10 (shown in FIG. 4). The first mold component 10 and second mold component 12 can be made of any suitable material, although it is anticipated that the mold components 10, 12 will be made of metal, plastic, or any other material that is capable of withstanding the pressures and temperatures that will be experienced by the mold components 10 and 12 during the molding process. It can be appreciated that the first mold component 10 can be formed from different materials than the second mold component 12.

Figure 2:
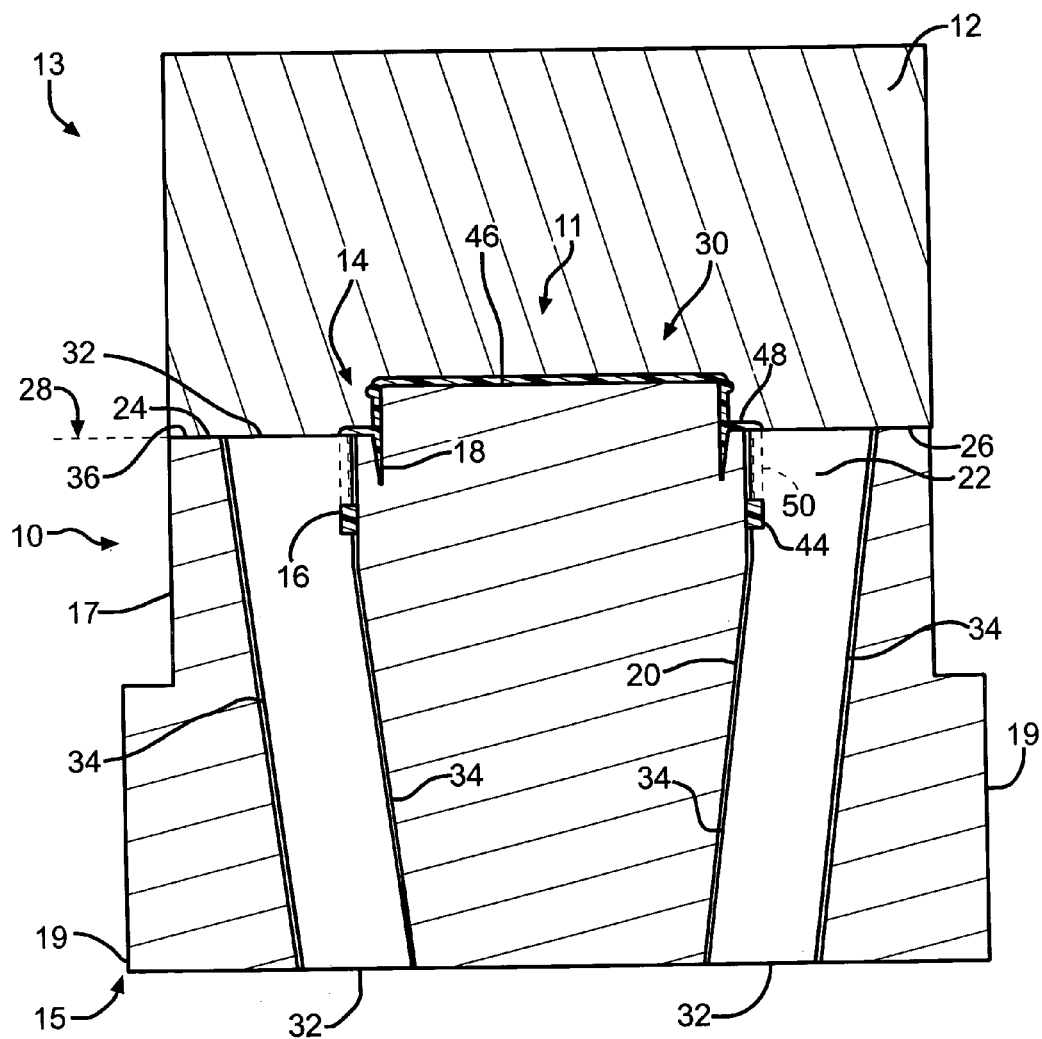
FIG. 2 is a sectional view of the first mold component of FIG. 1 through Line 2-2 and a sectional view of a second mold component according to the present invention.

Illustrated in FIG. 2 is a sectional view of the first mold component 10 through Line 2-2 of FIG. 1. Also shown in FIG. 2 is a section through the second mold component 12. As explained above, the first mold component 10 and the second mold component 12 cooperate to define the mold cavity 14. The first mold component 10 includes a first cooperating face 24 and the second mold component 12 includes a second cooperating face 26. When the mold components are assembled, the first cooperating face 24 and the second cooperating face 26 are positioned adjacent each other and define a parting line 28 of the mold assembly 13. The mold cavity 14 is shaped to form a first closure device 30. The first closure device 30 has an outer skirt 50 and an inner spring portion 58 (shown in FIG. 2) which are formed, respectively, by the first annular groove 16 and second annular groove 18. The first closure device 30 will be shown and described in greater detail below with respect to FIG. 5. The first annular groove 16 is illustrated as having a slightly greater depth than that of the second annular groove 18. Therefore, the outer skirt 50 of the closure device 30 will extend lower than the spring portion 58. The tracks 20 which are adapted to receive the ejector blades 22 are more clearly shown in FIG. 2.

The ejector blades 22 are substantially flat components configured to slide within the tracks 20. Therefore, it is preferred that the blades 22 be slightly smaller than the tracks 20 so that the sides of the blades 22 do not frictionally engage the sides of the tracks 20 so much that the friction prevents or inhibits the motion of the blades 22. Each blade 22 is polygonal in shape having a pair of opposed substantially parallel sides 32 (upper and lower sides). Each of those sides 32 is designed to be substantially flush with the respective upper surface 36 and lower surface 38 of the first mold component 10 while the blades 22 are positioned entirely within the tracks 20. A second pair of opposed sides 34 (inboard side and outboard side) of the blade 22 are also substantially parallel to each other and connect with the first pair of sides 32 at their respective ends. However, the second pair of opposed sides 34 are angled relative to an upper outer cylindrical surface 17 of the first mold component 10. Thus, the tracks 20 are tapered axially inwardly at upper end 11 of the first mold component 10. An upper portion 40 of the inboard side 34 of each blade 22 includes a notch 44 formed in the side 34 (shown in FIG. 3). A lower portion 42 of the inboard side 34 below the notch 44 is substantially parallel with the entire outboard side 34. The upper portion 40 of the inboard side 34 of the blade 22 that is above the notch 44 is substantially parallel with the upper outer cylindrical surface 17 of the first mold component 10, and is not parallel with the outboard side 34. The upper inboard portions 40 of the blades 22 preferably engage the first annular groove 16 at intermittent positions around the circumference of the first annular groove 16 because of the circumferential positioning of the tracks 20 as shown in FIG. 1. In addition, the notches 44 of each of the blades 22 are also in engagement with the first annular groove 16. Therefore, where the upper inboard portions 40 of the blades 22 are in engagement with the first annular groove 16, the moldable material is blocked from entering that portion of the first annular groove 16. However, the notch 44 allows the moldable material to enter that portion of the first annular groove 16 (at those intermittent positions). Thus, the upper inboard portions 40 of the blades 22 create substantially vertical slits or openings 54 in the first closure device 30, as is shown more clearly in FIG. 5. These openings 54 are also spaced around the circumference of the skirt 50 at intermittent positions.

The second mold component 12 defines a portion of the mold cavity 14 that forms the cap portion 46 of the first closure device 30. It is also preferred that a portion of the mold cavity 14 allows a substantially horizontal web 48 to be formed inwardly from the upper edges of the skirt 50. Although the closure device 30 is shown as having a skirt 50 and a cap portion 46, it can be appreciated that the web 48 can be a continuous section of material connecting the entire periphery of the skirt 50 (in which case the web 48 and the cap 46 would be the same), or can only connect the edges of the skirt 50 to the cap portion 46 as is shown in FIGS. 2 and 5.

Figure 3:
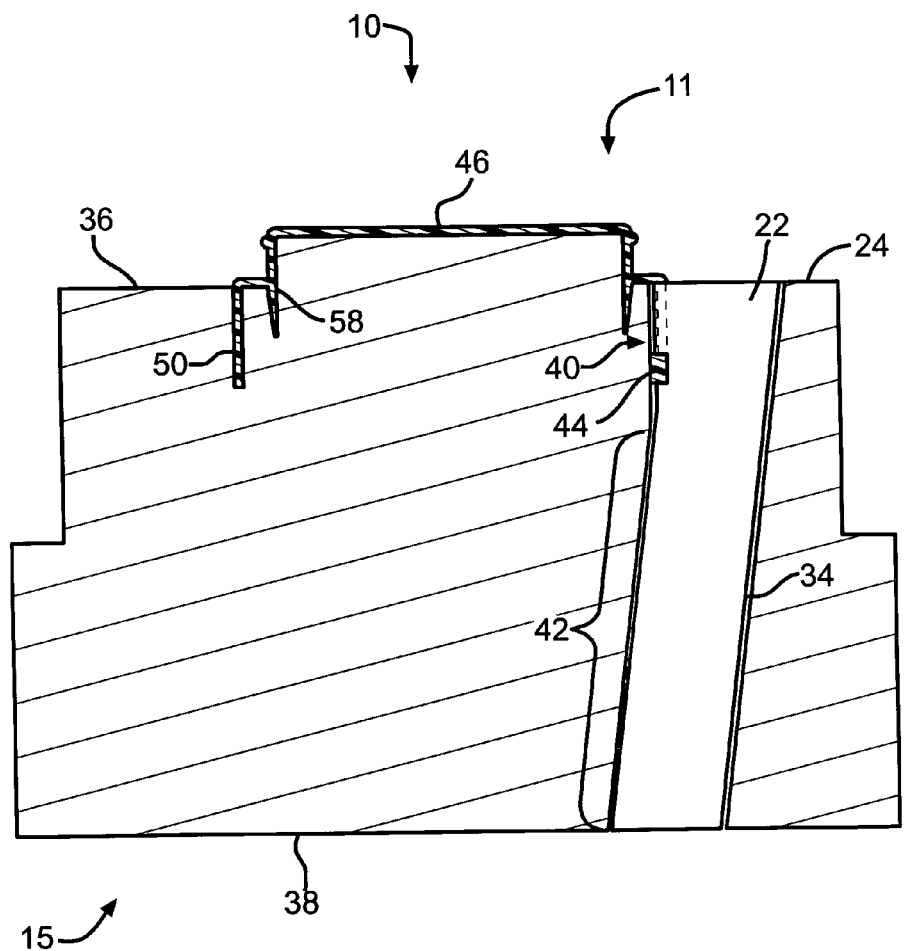
FIG. 3 is a sectional view of the mold component of FIG. 1 through Line 3-3.

A sectional view of the first mold component 10 through Line 3-3 of FIG. 1 is illustrated in FIG. 3. As shown in FIG. 3, the section is through one of the tracks 20 and depicts a blade 22 similar to that shown in FIG. 2. Also shown is a section through the first annular groove 16 and the second annular groove 18. This illustrates more clearly the relative depths of the annular grooves 16 and 18 and their positions relative to each other. Although the depth of the first annular groove 16 is greater than that of the second annular groove 18, it can be appreciated that the relative depths can depart from that which is shown according to the requirements of the particular closure device that is to be manufactured.

Illustrated in FIG. 4, the first mold component 10 is shown with the blades 22 in an at least partially extended position. It can be appreciated that the blades 22 would be moved into the extended position by the use of an ejector (not shown) for forcing the blades 22 in a path 31 that is generally along a generally vertical axis 52 of the first mold component 10. The path 31 of motion of the blades 22 preferably also includes a radially outward component. The angle of the radially outward orientation of the tracks 20 can be established to a degree necessary to relieve a back-lock of the closure device 30 in the first mold component 10. A back-lock is a condition where a portion of a molded component (in this case, the skirt 50 of the closure device 30) is formed about a portion of the mold such that either the mold or the molded component would have to be moved, deformed, or flexed to remove the molded component from the mold. In the embodiment shown in FIG. 4, the back-lock of the closure device 30, and more specifically the lug 60 of the skirt 50, is relieved by moving the blades 22 in an axially upward and radially outward direction. Therefore, the motion of the blades 22 is upward and outward relative to the first mold component 10. Since the closure device 30 is back-locked with the blades 22, the notches 44 of the blades 22 will apply an upward force to the lugs 60 and skirt 50 of the closure device 30. In addition, the more axially upward (and thus, radially outward) the blades 22 move, the more spacing will be created between the closure device 30 and the mold assembly 13. Therefore, the blades 22 will reach a point where the back-lock is relieved as the blades 22 move to a radially outward position that creates a sufficient separation between the notches 44 and lug 60 and skirt 50. When this sufficient spacing occurs, the closure device 30 can be removed from the first mold component 10 without deforming or flexing the closure device 30. As shown in FIG. 4, the upper portions 44 of the blades 22 will be substantially simultaneously withdrawn from the openings formed in the closure device 30. It can be appreciated that there are other methods for relieving a back-lock in a molded component. Typically, this would require deforming the molded component. However, the disadvantage of this is that the molded component can become damaged by that process. Therefore, relieving the back-lock in this manner alleviates that problem.

Illustrated in FIG. 5 is a sectional view of the closure device 30 formed by the mold assembly 13. As stated above, the closure device 30 includes a cap portion 46 and a skirt 50. The cap portion 46 is upper portion of the closure device as shown in FIG. 5. The top 56 of the cap portion 46 is a substantially continuous surface and can be flat, curved or have any suitable configuration. For use with a container (such as the container 100 shown in FIG. 7) in the orientation shown in FIG. 5, the skirt 50 and spring portion 58 will cooperate with the container 100 to releasably secure the closure device 30 to the container (therefore, the closure device is used in the CR position), as will be described below. Formed on the skirt 50 of the closure device 30 is a lug 60. The lug 60 is the portion of the closure device 30 formed by the notch 44 of the blade 22 due to the positioning of the blade 22 in the first annular groove 16. The upper portion 40 of the blade 22 blocks that portion of the first annular groove 16 so that the opening 54 is formed within the skirt 50. However, since the moldable material is permitted to flow into the notch 44 area, the skirt 50 will be formed having a continuous lower edge. Due to the position of the blades 22 in intermittent locations (i.e. tracks 20) about the circumference of the first annular groove 16, the lugs 60 will also be spaced intermittently about the inner surface of the skirt 50. The purpose of the lugs 60 will be described in greater detail below.

Also formed on a lower portion of the closure device 30 is the spring 58. The spring is an annular flange that extends down from the cap portion 46 of the closure device 30. The spring acts to provide a moisture tight seal between the closure device 30 and the container 100 to substantially exclude the intrusion of moisture and other contaminants. The sealing surface of the spring is adapted to engage the inner wall 103 of the container 100 at a predetermined distance axially downwardly from the upper open end of the container 100, as will become more apparent below. It is preferred that the spring 58 be formed of a plastic material having greater flexibility than the plastic material used for the skirt 50 and cap portion 46 of the closure device 30. This flexibility is preferably achieved by controlling the thickness of the spring portion 58 relative to that of the cap portion 46 and the skirt 50. The outer surface of the spring 58 and the inner surface of the skirt 50 define an annular slot between the spring 58 and the skirt 50 wherein the slot is sized to accommodate the thickness of the lip 102 of the container 100. To close the container 100 (as shown in FIG. 7), the spring 58 of the closure device 30 is positioned within the opening of the container 100.

The cap portion 46 of the closure device 30 is preferably substantially cylindrical and includes a side wall 62 connected about its circumference with the top 56. Formed around the side wall 62 is a snap ring 64. The snap ring 64 preferably is a continuous ring (or rings) around the side wall 62, but can be an intermittent ring (or rings) if so desired. The snap ring 64 is configured to engage a ridge 108 on the container 100 to releasably lock the closure device 30 to the container, as will be described below. The closure device 30 as shown can therefore be reversible to close the container 100 by either a CR or an NCR mechanism as will be described below. The use of the snap ring 64, however, causes the closure device 30 to be a NCR closure mechanism.

Illustrated in FIG. 6 is a male mold component 66 for forming a container such as the container 100 shown in FIG. 7. As can be understood by one skilled in the art, a female mold component (not shown) would be configured to cooperate with the male mold component 66 to define a mold cavity between the two mold components. The male mold component 66 has a generally cylindrical arm portion 68 formed at a first end 72 that is used to connect the mold component 66 to a molding apparatus (not shown). A second end 74 of the male mold component 66 is shaped to form the container 100 according to the present invention. The formed container 100 includes an upper portion or lip 102 having a first diameter D, an intermediate frustoconical portion or neck 104, and a lower portion or body 106 having a second diameter d. Therefore, the male mold component 66 includes a first portion 82 that has a slightly reduced outer diameter relative to the arm 68 and corresponds to the lip 102 of the container 100. This stepped down portion forms a stop 70 against which the female mold component would abut to define the upper edge of the mold cavity. The first portion 82 of the mold component 66 is generally cylindrical in shape. A second portion 84 of the male mold component 66 is tapered to form the neck portion 104 of the container 100 and to connect the outer diameter of the first portion 82 to the outer diameter of a third portion 86 of the male mold component 66. The third portion 86 of the male mold component forms the body portion 106 of the container 100. As shown, the diameter of the third portion 86 is less than the diameter of the first portion 82. The length L of the third portion 86 is preferably larger than that of the first portion 82 because the third portion 86 will form the body 106 of the container 100. The body 106 of the container 100 will primarily be used to hold the contents of the container 100. However, it should be appreciated that the dimensions of the container 100, and therefore the mold components, can be other than those shown depending on the desired configuration of the container and its desired function (e.g. the amount of material for the container to hold, the size of the materials held in the container, etc.).

Formed on the first portion 82 of the male mold component 66 are a plurality of recesses 88 formed at intermittent positions about the circumference of the first portion 82. During the molding process the recesses 88 receive a moldable material such that intermittent ridges 108 are formed on the inner surface of the upper open portion 110 of the container. It is known to form ridges on an inner surface of a container. However, in the preferred embodiment, the ridges 108 are formed from the recesses 88 cut into the first portion 82 of the male mold component 66. The recesses 88 have a tapered profile such that the thickness of the recesses 88 is greater at the center of the recesses 88 than at the edges. The profiles of the ridges 108 formed by the recesses 88 are more clearly shown in FIG. 8. The profile of the recesses 88 allows for greater ease in removing the male mold component 66 from the molded part. Using a recess 88 that is formed having the same depth around the circumference of a mold component will create a back-lock situation similar to that which was described above. Using the profile of the recesses 88 (and thus the profile of the ridges 108 formed on the container 100) as shown and described herein, the molded component (the container 100) will be easier to remove (eject, strip or relieve) from the male mold component 66 because of the thermal properties of the moldable material at the thickest portion of the container 100 (at the ridges 108) during the cooling stage of the molding process. The inner and outer surfaces of the formed container will cool first thereby forming an outer and inner skin. The material between the inner and outer skins will remain partially molten for a slightly longer period of time. Only the portion of the container 100 that has the ridges 108 formed thereon will have to deflect during the removal step of molding the container 100. Therefore, the non-ridge portion of the container 100 can deflect less, which reduces the likelihood of permanent deformation of the container 100. In addition, the profile of the ridges 108, shown in FIGS. 7 and 8, on the container 100 also allows for a better releasable fit between the snap ring 64 of the closure device 30 and the formed ridges 108. This is due to a reduced frictional interference between the snap ring 64 and the ridges 108 at the edges of the ridges 108.

Illustrated in FIG. 7 is the container 100 formed using the male mold component 66 of FIG. 6. As described above, the container 100 has a upper or lip portion 102, an intermediate or neck portion 104 and a lower or body portion 106. As it is shown, the second diameter d (diameter of the body) is less than the first diameter D (diameter of the lip), it can be appreciated that such a configuration can be reversed, or that the container 100 has a substantially constant diameter. The body 106 defines the primary portion of the container 100 that will be used to hold the materials the container 100 is designed to hold. In the embodiments described herein, the container 100 is configured to be used for holding prescription or other medicine. Thus, the container 100 is shaped and sized to hold a plurality of pills, capsules, powder, liquid, etc. The lip 102 of the container 100 is configured to cooperate with a closure device such as the closure device 30 described above with respect to FIG. 5. According to the present invention, the container 100 can also be used with the closure devices 112 and 124 shown in FIGS. 9 and 10, as will be described in greater detail below.

The lip 102 of the container 100 includes an inner surface 103 and outer surface 105. As described above, the inner surface 103 includes a plurality of intermittent ridges 108. The ridges 108 are configured to cooperate with the snap ring 64 formed on the side wall 62 of the cap portion 46 of the closure device 30 shown in FIG. 5. The snap ring configuration is designed to form a non-child-resistant (NCR) closure mechanism for the closure device 30 with the container 100. Particularly, the snap ring 64 engages the inner surface 103 of the container 100 below the ridges 108. Therefore, when a user is closing the container 100 using the closure device 30, the snap ring 64 of the closure device 30 is pushed past the intermittent ridges 108. Similarly, when the container 100 is opened, the user applies pressure to the closure device 30 in an upward manner to overcome the interference between the snap ring 64 and the intermittent ridges 108. The amount of force required to open and close the container 100 can be varied according to the size and shape of the snap ring 64, the size and shape of the intermittent ridges 108, the diameter of the container 100 and the corresponding closure device 30, the number of ridges 108, and the materials used to form the ridges 108 and snap ring 64. It would be preferred that the force required to open and close the container 100 be such that the container 100 can be easily opened and closed by someone with a handicap, the elderly, or someone with limited manual dexterity.

Formed on the outer surface 105 of the lip 102 of the container 100 are a plurality of bayonets 107. The bayonets 107 are radially outward projections formed on the lip 102 of the container 100 adjacent the upper, open end thereof to releasably attach the closure device 30 to the container 100. Each bayonet 107 includes a recess 109 on a lower surface of the bayonet 107. The recess 109 is configured to receive the locking lug 60 of the closure device 30 to secure the closure device 30 to the container 100. The lower surface of the bayonets 107 also define a cam wall 111 and a stop 113. The upper surface 115 of each bayonet 107 is a substantially continuous wall that connects the cam wall 111, the recess 109 and the stop 113. To use the closure device 30 to close the container 100, the closure device 30 is positioned so that the locking lugs 60 are moved between the spaced apart bayonets 107 and to a point adjacent the cam wall 111 of the bayonet 107. At the same time, the closure device 30 is pressed downwardly (towards the container 100) and rotated to engage the lugs 60 with the recesses 109 of the bayonets 107. Moving the lugs 60 into such a position is facilitated by sliding the lugs 60 along the curved surface of the cam wall 111. The shape and orientation of the cam wall 111 assists the user in applying downward pressure to move the lugs 60 into engagement with the recesses 109. To release the closure device 30 from the container 100, the motion is reversed with downward pressure releasing the lugs 60 from the recesses 109. The cam wall 111 will facilitate the movement of the lugs 60 towards the space between adjacent bayonets 107. The method of operating such a child resistant closure mechanism is generally known in the art. As described above, the spring 58 can deflect slightly when the closure device 30 is pressed onto the container 100. It is preferred that the spring 58 acts to form a seal against the inner surface 103 of the container 100 to protect the contents of the container 100 from moisture and other possible contaminants. Conventionally, a separate, resilient plastic member is connected with a closure device to provide such a seal as well as to provide a compressive surface against which the force to press the closure device onto the container can be applied. The embodiment according to the present invention removes the need for a two-piece closure device, thereby simplifying the manufacturing and production processes while maintaining the integrity of the sealing mechanism.

Illustrated in FIG. 8 is a partial plan view of the upper portion 102 of the container 100. The view has been simplified to essentially show the upper portion or lip 102 of the container 100 and the ridges 108 formed on the inner surface 103 of the container 100. Therefore, the bayonets 107 have been removed from the outer surface 105 of the lip 102 for the purposes of clarity. Each ridge 108 has a profile that has a tapered thickness across the length of the ridge 108. Thus, at a first end 76 the ridge 108 has a narrow thickness. The ridge 108 reaches its greatest thickness at approximately the center 78 of the ridge 108. The thickness then tapers at a second end 80 to a narrow thickness. The snap surface 109 that is configured to engage a snap ring of a closure device is therefore formed as a chord. In plane geometry, a chord is a line segment joining two points on a curve. The term is often used to describe a line segment whose ends lie on a circle, such as is shown in FIG. 8. It is preferred that the ridges 108 have the shape described herein. However, it can be appreciated that the ridges 108 can have a shape that does not define a chord while maintaining a tapered thickness profile. Illustrated in FIG. 11 is a prior art container 150 having ridges 152 formed on an inner surface 154 of the container 150. The profile of the ridges 152 shown in FIG. 11 have a substantially constant thickness across their lengths. As stated above, the advantage of having the ridge profile as shown with respect to the preferred embodiments is that the container 100 is more easily removed from the male mold component 66 as was described above. In addition, the ridge design, as shown and described, can be used to control and more consistently regulate the force required by a user to remove and attach a closure device 30 to a container 100.

Figure 9:
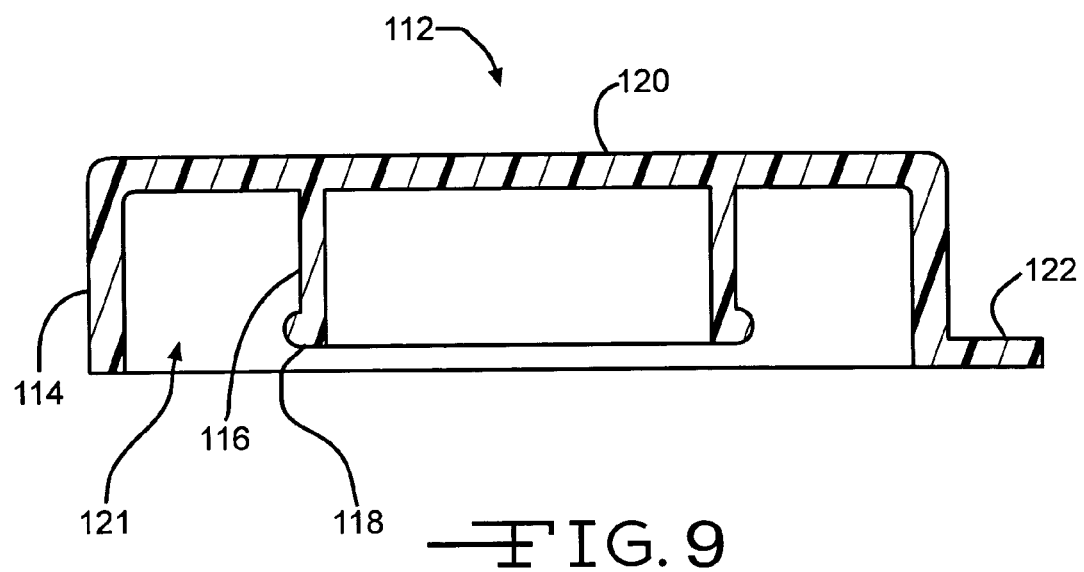
FIG. 9 is a sectional view of a second closure device according to the present invention.

An alternate closure device is shown in sectional view in FIG. 9. This second closure device 112 is designed to perform substantially as described above with respect to the snap ring and intermittent ridge design. The second closure device 112 shown in FIG. 9 includes an outer skirt 114 that fits around the lip 102 of the container 100, and defines a first diameter. The edges of the skirt 114 are connected by a cap portion 120. A cylindrical inner flange member 116 extends from the cap portion 120 of the second closure device 112 and has a snap ring 118 formed thereon. The inner flange 116 is also generally cylindrical and defines a second diameter that is less than the first diameter. The inner flange member 116 and outer skirt 114 are preferably concentric. The outer surface of the inner flange member 116 and the inner surface of the skirt 114 define a slot 121 that is sized to accommodate the thickness of the lip 102 of the container 100. To close the container 100, the inner flange member 116 is positioned within the opening of the container 100. The closure device 112 is preferably sized so that the outer surface of the flange member 116 engages the inner wall 103 of the container 100. Thus, the snap ring 118 formed on the inner flange 116 would cooperate with the intermittent ridges 108 formed on the container 100, in the same manner as described above with respect to the snap ring 64 of the closure device 30 in FIG. 5. If so desired, the outer skirt can also include a tab 122 that extends from a portion of the skirt 114 to provide the user a lever against which a force can be applied to overcome the frictional interference between the snap ring 118 and the ridges 108 of the container 100. The tab 122 can have any suitable size and shape depending on the anticipated user and their ability to operate the closure device 112.

Figure 10:
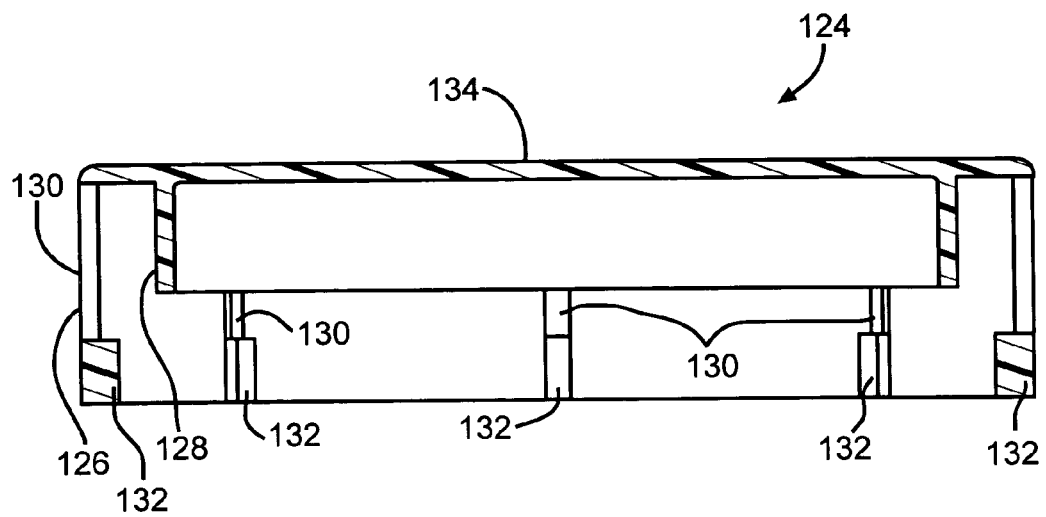
FIG. 10 is a sectional view of a third closure device according to the present invention.

A third closure device 124 is shown in a sectional view in FIG. 10. This closure device 124 is designed to perform substantially as described above with respect to the child-resistant closure device. The third closure device 124 includes an outer skirt 126, an inner spring member 128 and a plurality of lugs 132 formed about the inner surface of the skirt 126. The lugs 132 are used to engage the recesses 109 of the bayonets 107 formed on the outer surface 105 of the lip 102 of the container 100. The closure device 124 can also include a plurality of openings 130 that are similar to the openings 50 shown with respect to the first closure device 30.

The invention also pertains to a system for providing containers and closure devices for the containers. Conventionally, a retail outlet of CR and NCR containers and closure devices (pharmacies, for example) maintain a stock of differently sized containers and closure devices. The size of the container for each prescription will depend on such factors as the size of the pills, the total number of pills to fill the prescription, etc. However, such a practice typically requires that for each differently sized container, the retail outlet must maintain an inventory of both CR containers with corresponding CR closure devices, and NCR containers with corresponding NCR closure devices. Therefore, depending on the needs of the customer, a proper type of container and closure device can be provided. However, such a practice requires the maintenance of a large amount of empty containers and closure device. Additionally, in some situations, a customer could require both a CR closure device and an NCR closure device, a situation not addressed by conventional methods of medicine dispensing.

Therefore, the system according to the present invention alleviates some of the problems encountered with the conventional methods of medicine dispensing. The system of the present invention includes providing a plurality of containers 100 wherein each of the containers 100 has a lip 102 defining substantially similarly sized diameters as each other. The lips 102 of the containers 100 are configured to cooperate with a closure device. The system also includes providing a first closure device 30, a second closure device 112, and a third closure device 124. The second closure device 112, substantially similar to that shown in FIG. 9, is configured to cooperate with the intermittent ridges 108 formed on the inner surface 103 of the container 100 to releasably retain the closure device 112 with the container 100. The third closure device 124, substantially similar to that shown in FIG. 10, is configured to cooperate with a bayonet 107 closure mechanism formed on an outer surface 105 of the container 100 to releasably retain the closure device 124 with the container. The first closure device 30 is configured to cooperate with either the intermittent ridges 108 or the bayonet 107 closure mechanism to releasably retain the closure device 30 with the container 100. The system also allows the user (such as a pharmacist) to select one of the first closure device 30, the second closure device 112 and the third closure device 124. After filling the prescription, the user can assemble the selected closure device and container 100. As can be appreciated by the description of the closure devices above, the first closure device 30 is reversible so that it can be used as either an NCR closure device or a CR closure device. The second closure device 112 is an NCR closure device and the third closure device 124 is a CR closure device.

The system according to the present invention also provides an advantage for medicine dispensing according to automated dispensing systems. It is anticipated that one method of automated medicine dispensing would include a pharmacist or other user inputting the desired medicine information into a computer. An automated mechanism would then select the proper size container, fill the container with the appropriate medicine, print a label for the container and affix it thereto, and provide the filled container to the pharmacist. The pharmacist can then identify that the proper medicine was dispensed and select the proper closure device (CR, NCR, reversible) for the end user of the container. Thus, it would be advantageous for the automated system to be supplied with containers that can be used with either CR, NCR, or reversible closure devices, or all three, such as is described above. Therefore, the system according to the present invention can be easily adapted to be used in an automated medicine dispensing system.

It should be appreciated that either or both the container 100 and closure devices 30, 112, and 124 can be made of any suitable material. Additionally, the materials used to form the above components can be opaque so that sunlight or other light does not react with the medicine or other materials contained within the container 100. However, the above components can also be translucent so that the contents can be more easily seen without having to remove the closure device 30, 112, 124. Also, the container 100 could be opaque and the closure device 30, 112, 124 used with the container 100 can be translucent so that a user can look through the cap to see what the contents are. Alternatively, the closure device 30, 112, 124 could be opaque with the container 100 being translucent. Finally, the container 100 and closure device 30, 112, 124 can be made of any color. Using various colors for medicine containers 100 can help a user to identify one medication from a variety of medicines or identify which medicines are to be taken at what times. The various colors for the containers can also be used as identifying indicia for various other characteristics of the medicines as well.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for forming a closure device for a container comprising:

provide a first mold component having a first annular groove, wherein the first annular groove is configured to form a skirt of the closure device;

providing a plurality of ejector blades positioned within the first mold component, the blades including a notch thereon for forming a lug on an inner surface of the skirt of the closure device, the lug being back-locked relative to the first mold component;

providing a second mold component configured to cooperate with the first mold component to define a mold cavity;

introducing a moldable material into the mold cavity to form the closure device; and removing the closure device from the first mold component by moving the blades along a path defined by a plurality of tracks formed in the first mold component that is generally along a vertical axis of the first mold component, wherein the path includes a radially outward component, and the moving of the blades relieves the back-lock of the lug formed on the closure device.

2. The method defined in claim 1 further comprising a second annular groove that is substantially concentric with the first annular groove, the second groove being configured to form a spring of the closure device.

3. The method defined in claim 2 wherein the spring defines an annular flange extending from the closure device for providing a seal between the closure device and the container.

4. The method defined in claim 3 wherein the skirt defines an annular flange extending from the closure device, the skirt being configured to fit about an outer portion of a lip of the container.

5. The method defined in claim 4 wherein an annular slot is defined in a space between an outer wall of the spring and an inner wall of the skirt, the annular slot being configured to receive the lip of the container.

6. The method defined in claim 1 further comprising the step of providing a container having a bayonet portion formed on an open end of the container, the bayonet portion being configured to correspond with the lug formed on the skirt such that the lug engages the bayonet portion when the closure device is locked to the container.

7. The method defined in claim 1 wherein the plurality of tracks are configured to receive the plurality of blades, the tracks being tapered at an axially inward end of the first mold component.

8. The method defined in claim 1 wherein the formed closure device can be removed from the mold assembly without flexing the closure device.

9. A method of forming a generally cylindrical container comprising the steps of:

providing a generally cylindrical male mold component having a plurality of intermittent grooves formed about a circumference of the male mold component, the intermittent grooves having a tapered profile formed thereon such that the thickness of each of the grooves is greater at its center than at its edges along the circumference of the male mold component;

providing a female mold component defining a generally cylindrical recess;

positioning the male mold component substantially coaxially within the recess of the female mold component with the space between the male mold component and the female mold component defining a mold cavity;

introducing a moldable material into the mold cavity;

molding the moldable material into the container;

separating the male mold component from the female mold component; and removing the molded container from the mold cavity.

10. The method defined in claim 9 wherein each of the intermittent grooves have a profile defining a narrow depth at a first end, a narrow depth at a second end, and a relatively greater depth at a center of the groove, thereby forming the tapered profile of the groove.

11. The method defined in claim 10 wherein the intermittent grooves on the male mold component form intermittent ridges on an inner surface of the container, the intermittent ridges being configured to cooperate with a snap ring formed on a first closure device to releasably secure the first closure device to the container.

12. The container defined in claim 9 wherein an outer surface of the open end of the container includes a rim portion having a bayonet closure mechanism formed thereon, the bayonet closure mechanism being configured to cooperate with a second closure device for releasably securing the second closure device to the container.

* * * * *